United States Patent [19]
Bryk et al.

[11] 3,754,891
[45] Aug. 28, 1973

[54] METHOD OF PRODUCING IRON-POOR NICKEL SULPHIDE MATTE FROM SULPHIDIC NICKEL CONCENTRATES IN SUSPENSION SMELTING THEREOF

[75] Inventors: Petri Baldur Bryk, Helsinki; Jorma Bruno Honkasalo, Westend; Rolf Einar Malmstrom, Pori; Simo Antero Livari Makipirtti, Nakkila; Toivo Adrian Toivanen, Harjavalta; Olavi August Aaltonen, Pori, all of Finland

[73] Assignee: Outokumpu Oy, Outokumpu, Finland

[22] Filed: Mar. 29, 1971

[21] Appl. No.: 128,803

[30] Foreign Application Priority Data
Apr. 10, 1970 Finland .................................. 1000

[52] U.S. Cl. .......................... 75/23, 75/7, 75/74, 75/110, 423/571
[51] Int. Cl. ... C22b 15/00, C22b 1/02, C22b 15/04
[58] Field of Search .................. 75/23, 21, 26, 34, 75/76, 73, 74, 6–9, 116

[56] References Cited
UNITED STATES PATENTS

| | | | |
|---|---|---|---|
| 3,306,708 | 2/1967 | Bryk | 423/571 |
| 2,817,583 | 12/1957 | Schlecht | 75/7 |
| 2,683,077 | 7/1954 | Lewis | 75/23 |
| 2,719,082 | 9/1955 | Sproule | 75/116 |
| 3,441,403 | 4/1969 | Fredrickson | 75/74 |
| 746,77 | 12/1903 | Aiken | 75/23 |
| 963,020 | 6/1910 | Channing | 75/23 |
| 2,860,999 | 1/1959 | Rosenquist | 75/6 |
| 3,004,846 | 10/1961 | Queneau | 75/23 |
| 3,351,462 | 11/1967 | Arentzen | 75/21 |

FOREIGN PATENTS OR APPLICATIONS

350,625 6/1931 Great Britain ......................... 75/23

*Primary Examiner*—L. Dewayne Rutledge
*Assistant Examiner*—Peter D. Rosenberg
*Attorney*—Albert M. Parker, Lorimer P. Brooks, Harold Haidt, Charles G. Mueller, Alfred L. Haffner, Jr. and G. Thomas Delahunty

[57] ABSTRACT

A fine-grained concentrate of sulphide ore is suspended by a special disperser into a heated downward flow of air, air enriched with oxygen or oxygen containing gas in a vertical reaction shaft of a furnace to oxidize non-oxidic metal compounds in the concentrate. The gases and flue dust are separated from the solids which form a smelt on the furnace bottom which smelt consists of a matte and a slag on the matte. Oxidation of matte in the lower furnace and incorporation of nickel oxide into the slag are prevented by reducing trivalent iron and nickel oxides in the lower part of the reaction shaft before the gases enter the lower furnace. The reduction is effected by increasing the partial pressure of sulphur of the gases and/or by decreasing the partial pressure of oxygen.

6 Claims, 2 Drawing Figures

METHOD OF PRODUCING IRON-POOR NICKEL SULPHIDE MATTE FROM SULPHIDIC NICKEL CONCENTRATES IN SUSPENSION SMELTING THEREOF

BACKGROUND OF THE INVENTION

1. Field of the Invention

The invention relates to the field of flash smelting of sulphide ores.

2. Description of the Prior Art

In the following, two reverberatory smelting processes applied to mass production are discussed first, namely, those used by The International Nickel Company and Outokumpu Oy, on the basis of the patent information. Then other, old and new, processes for the production of copper and nickel, or connected with the production of such, are discussed.

The processes developed at The International Nickel Company mainly relate to the refining of sulphidic nickel ores or nickel and copper ores to the metallic stage.

A process is known from U.S. Pat. No. 2 668 107 which relates to the separation of nickel and copper from the respective sulphides by autogenetic suspension smelting. The process is carried out in a shaftless furnace or furnace system by horizontal burning of concentrate with oxygen and/or oxygen-rich air. In addition to burning of concentrate, the process includes an analogical burner which burns pyrite or pyrrhotite and which is used either at the same time as the burner of concentrate or at a different time. The product of this burner (smelted iron sulphide) is used for the reduction of slag (four different examples with different processes or constructions are given in the patent description). The products of the process are rich nickel-copper matte (U.S. Pat. No. 2 668 107: rich matte contains ≥ 15 percent total Ni and/or Cu; BRD Pat. No. 840 441, 1952 page 3, lines 19–23; matte contains 15–65 percent Cu + Ni) and low-content slag.

The next stage of development in the treatment of sulphide ores is represented by the process described in U.S. Pat. No. 3 069 254. In this process, an axially tiltable, rotating — mechanical stirring — converter working with oxygen and/or air (rich in oxygen) by the surface blowing method to blow pure nickel sulphide into anodic nickel at a high temperature (the starting phase with oxygen at a temperature of about 1315°C and the final phase with dilute gas at a temperature of 1650°C – 1760°C). Before the converting, iron, copper, and other unwanted metals must be removed from the matte. The same furnace unit can be used in the production of pure nickel matte from a concentrate, but in several different phases. The fayalite slagging of iron is carried out first. After the slagging of iron — several phases — the copper is removed by the liquid-liquid leaching process described in the patent ($Na_2S$ + NaCl mixture treatment at a temperature > 732°C), and finally a possible removal of cobalt as an orthosilicate takes place in connection with the blowing of nickel.

The described process is also connected with the process according to U.S. Pat. No. 3 004 846 for the treatment of nickel-containing silicate ores. Finely-ground nickel-containing silicates, such as laterites, are reduced and sulphidized in a controlled atmosphere, selectively, at a temperature of ≥ 870°C, in a drum furnace so that the nickel and about twice the corresponding amount of iron are reduced and sulphidized (U.S. Pat. No. 2 850 376). The selectively sulphidized drum furnace product is smelted into matte and slag in an electric furnace. After the removal of iron, copper, cobalt, etc., the obtained matte can be smelted into anodic nickel according to the previous process. The iron can be removed separately by blowing it into slag with a Bessemer converter. The other components can be removed from the sulphide either by the process described above (U.S. Pat. No. 3 069 254) or by some other process.

The processes developed at Outokumpu Oy relate to the refining of sulphidic copper or copper-nickel concentrates, as well as to the refining of other sulphidic concentrates such as lead, iron and mixed concentrates, and to the treatment of sulphur-containing gases created in the process. What the processes have in common is the use of the equipment developed for the carrying out of the basic process, namely, the reverberatory smelting of sulphidic copper concentrate. In the course of tens of years, the equipment has been improved technologically to met the requirements of various sulphide concentrates and sulphur gases. As an exception from the other technological applications of suspension smelting processes, the furnace system includes a considerably high vertical reaction shaft. The operation of the shaft is characterized by a high processing temperature and a great oxygen pressure gradient in the vertical direction of the shaft, which makes possible a very effective burning of concentrate while the operation of the shaft can still be controlled with accuracy.

The process according to Finnish Pat. No. 22 694 constitutes the basic process of autogenetic suspension smelting. According to this process, rich matte (white metal) or raw copper can be obtained in one furnace by suspension smelting (co-current principle) copper concentrates with a suitable general construction of the vertical reaction shaft controlled by oxygen pressure and the horizontal lower furnace.

The next stage of development is the application of the described process — since 1959 — to the smelting of sulphidic nickel-copper concentrate (T. Toivanen, P.O. Gronqvist: Can. Mining Met. Bull., June 1964, pp. 1–6) so that, in spite of relatively high matte contents (30–50 percent Cu + Ni and Cu/(Cu + Ni) ~0.2 – 0.3), the respective slag contents are low. When the burning and control techniques of the suspension shaft developed, the process could also be taken into use in the demanding, highly reducing suspension smelting of pyrite concentrate, the products of which are a controlled gas phase composition required for the production of elemental sulphur, and poor iron matte for the production of iron ore. The process is described in Finnish Pat. No. 32 465. The equipment according to the basic patent was applied to the suspension smelting of sulphidic lead concentrates in 1964. With the process according to this Finnish Pat. No. 40 497, the final products obtained from the oxidizing suspension smelting are raw lead, and slag very poor in lead.

The recent development of suspension smelting processes and technology can be seen, for example, from the following processes:

Finnish Pat. No. 45037 in which the burning and shaft techniques of suspension smelting are used for the reduction of hot, dust-containing roasting gases.

Finnish Pat. No. 44797 in which solid, liquid or gaseous raw fuel is injected into the reaction shaft to meet the needs of the decomposition reaction of endothermic pyrite. An addition to this process is the process in which the additional oxidation of the iron sulphide produced in the shaft reaction is carried out in the reaction shaft and the reduction required to create the correct catalytic ratio of the formed reaction gases is carried out with raw fuel after the reaction shaft; the process is used to increase the output of elemental sulphur.

The new processes concerning the refining of sulphidic copper concentrate published in recent years relate mainly to the production of white metal and/or metallic raw copper in the same furnace unit.

The purpose of the process described in U.S. Pat. No. 3,460,817 is to create a process for the production and further oxidation of white metal without transferring it to a separate converter. In this process, the shaft smelting furnace has been provided with an additional shaft (suspension burning) in which the iron sulphide smelt required for the "Cu wash" of the slag is produced. The shape of the bottom of the furnace — smelting, slag reduction and converting zone — has been constructed to suit the moving of the smelts in the desired direction. White metal is blown into raw metal in a part of the furnace unit separated with a sifon-like device. Let it be mentioned that the use of smelted iron sulphide for the refining of slag in the process is functionally analogous to the process mentioned in the patent description of U.S. Pat. No. 2 668 107 in all other respects but in that the horizontal suspension burning of iron sulphide used by Gordon has been replaced with vertical burning in a separate shaft. The process according to the application has been compared to the Outokumpu process in the description. However, let it also be mentioned that, in the Outokumpu process, white metal and raw copper can be produced, when desired, by normal techniques in one furnace unit without using a separate burning of sulphides, and the copper contents of the slags remain sufficiently low in spite of it (U.S. Pat. No. 2,506,557).

In the process according to Canadian Pat. no. 814,926 (known as the Worcra smelting process), raw copper is produced from sulphide concentrate in a similar manner and in an almost similar, but shaftless, furnace unit (smelting, slag reduction and converting zone) as in the method described above. However, the concentrates and the slagging materials are fed, in a manner deviating from the suspension processes, as damp agglomerates into heaps in the furnace space. White metal is blown, with oxygen or oxygen-rich air, into raw copper partly in its formation zone and partly in an area of the furnace separated with a sifon device. The "Cu wash" of the slag is carried out with iron sulphide (mixing carried out with burner flames).

Of the old technological and process methods and suggestions, let the following be mentioned:

U.S. Pat. No. 578 912. In this process, the suspension smelting is carried out in a reverberatory furnace by the horizontal burning process.

U.S. Pat. No. 1 164 653. In this process, preheated air is used in the process according to the previous patent.

In the publication AIME, 106, 1933, pp. 104–110 (F. Laist J.P. Cooper) it is suggested that a shaft furnace be constructed on the top of a reverberatory furnace and that suspension roasting and reverberatory smelting be carried out.

In the publication Eng. and Min. Jour. 137, 1936, pp. 499–502, 562–567 (T.E. Norman) the use of oxygen or oxygen-rich air is suggested for the reverberatory smelting of copper and/or nickel concentrates.

Of the processes developed in connection with suspension roasting (Fe, Cu, Ni, Pb, Zn and other sulphides) and the reduction of the obtained roasting gases, let the following be mentioned:

U.S. Pat. No. 2 209 331. In this process, a vertical tower is used in which sulphidic material is roasted with oxygen or oxygen-rich air as a finely-ground suspension by either cocurrent or countercurrent methods, or both at the same time. The completely or partially oxidized products are separated from the gas phase at the lower end of the tower either in a solid or a smelted state. If the concentrates contain metals such as Cu, Ni, Pb, etc., they can be separated as metals in a smelted state or as matte by magn. separation, flotation, chlorination, leaching, or a reverberatory.

Similar to the above with its co- and countercurrent principles and $SO_2$ reduction is the process described in U.S. Pat. No. 2 040 682 (R.F. Bacon et al., 1963).

Finnish Patent No. 24 574. In this process, the roasting of sulphide concentrates is carried out in suspension in the following manner: Flues that can be closed selectively have been fitted at different heights in the walls of the roasting shaft. With the secondary air and/or oxygen blown in through the flues, an inactive bed of air is created in the shaft. The sulphur content of the roast and the temperature of the smelting material are controlled by the bed of air.

In conclusion, it can be stated that a suitable, simple mass-production process for the production of rich nickel matte or rich nickel-copper matte by suspension smelting cannot be found among the processes discussed above. The new processes developed for the production of rich copper matte or raw metal also prove that, at least from the technological point of view, the development is not directed towards simple solutions but it is drifting towards complicated technical constructions obtained by combining old undeveloped methods with more or less success and, obviously, towards a more difficult practical control of the systems as a consequence.

The main purpose of the process introduced in the U.S. Pat. application Ser. No. 2471 is to improve the suspension smelting process in the production of metallic copper and white metal. If raw fuel is fed into the lower furnace, the sulphur potential of the gases after the reaction shaft is increased so that a partial or complete sulphidizing of the flying dust to be returned to the system takes place. This will improve the degree of autogenesis in the reaction shaft. Several other advantages are gained simultaneously, such as recovery of sulphur in an elemental form when the reaction gases are adapted to meet the requirements of the sulphuric acid industry in the production of raw metal or white metal the copper which is usually present in the slag in a metallic or sulphidic form agglomerates because of the increase of the sulphur potential of the gases of the lower furnace, and the trivalent iron in the slag decreases; these two processes together lower the copper content of the slag.

The process according to this invention prevents the trivalent iron and nickel oxide formed in connection with a very effective oxidation from ending up in the separation of matte and slag in the lower furnace.

SUMMARY OF THE INVENTION

According to the invention trivalent iron and nickel oxide produced in the oxidation are reduced in the lower part of the reaction shaft by increasing the partial pressure of sulphur of the obtained gases and/or by decreasing the partial pressure of oxygen in the lower part of the reaction shaft even before the gases are conducted into the lower, or settler part of the furnace, in which case the oxidation of the matte in the lower furnace and the ending up of the nickel oxide into the slag phase are prevented.

An oxidation of the sulphidic concentrate is first carried out in suspension in the reaction shaft of the reverberatory smelting system so that most of the iron is oxidized. The dissociation pressures of iron and nickel sulphides are very close to each other and, consequently, it is very difficult, even impossible, to carry out a selective oxidation of iron with the used techniques practicable in mass production. In connection with an almost complete oxidation of iron, a considerable part of the nickel of the concentrate is also oxidized. In nickel-containing sulphidic concentrates the nickel is usually bound in pentlandite crystals containing an almost equal or greater amount of iron. When rich matte is produced from the crystals, iron, also, must be oxidized. Pentlandite, as other nickel-containing sulphides, kindles at a higher temperature and burns slower than the nickel-free iron sulphide (usually pyrite-containing pyrr-hotite) which forms the principal part of the concentrate. Consequently, when usual pyrotechnology is used, considerable amounts of trivalent iron is formed while the previously oxidized (pyrrhotite) iron is oxidized further. Thus, by using the conventional technology, suspension oxidation cannot be controlled as precisely in the processing of nickel concentrates as in the production of concentrated copper matte. The amount of matte phase formed in the lower furnace from the shaft product produced under the said conditions is very insignificant because a considerable part of the sulphide in the shaft product is used for the reduction of the trivalent iron in the slag phase, in which case the losses of nickel into the slag phase increase further. The nickel oxide formed when the shaft product or matte is oxidized is bound in the slag phase into a diluted solution in the iron, magnesium or nickel silicate smelt, from which it is difficult to reduce it by the conventional methods by gas reduction in the lower or settler part of a furnace or in a separate slag furnace by using normal delay periods and temperatures and conventional technology, which are common in, for example, the production of poor nickel matte or rich copper matte.

The process is based on the increase of the sulphur potential of the gas phase after the oxidation and on the lowering of its oxygen pressure to such an extent that the solid nickel oxide or nickel ferrite which is still in a state of suspension, will decompose into metallic nickel, and/or so that the sulphur pressure corresponding to the dissociation pressure of nickel sulphide is surpassed but not the dissociation pressure of iron sulphide, in which case a selective sulphidizing of nickel will take place. A sufficient amount of the unstable trivalent iron will be reduced simultaneously. The reduction is carried out with a quickly reacting material containing carbon, such as light petrol, and/or gaseous elemental sulphur. In this process, the oxidation is carried out at a temperature some 50°C higher (that is, 1350°–1450°C) than what is used in the production of poor nickel matte. The reduction process will not affect the temperatures of the system if the burning has succeeded conventionally, that is, no free oxygen appears in the reaction shaft after the oxidation.

According to the invention, nickel matte poor in iron is produced from low-grade concentrates containing nickel or nickel and copper. In the process, a very effective burning of the concentrate is first carried out in suspension in the reaction shaft of the reverberatory smelting system, at which time the iron and part of the nickel are oxidized. After the oxidation, the reduction of the trivalent iron and nickel oxide created in the oxidation process is carried out in the lower part of the same reaction shaft so that the matte is prevented from oxidizing in the separation of matte and slag and the nickel oxide from ending up in the slag phase. The purpose of the invention is to create a process which is technically and economically more advantageous than the previously known suspension smelting processes used in the production of sulphide matte.

According to the invention, this is brought about so that the trivalent iron and nickel oxide created in the oxidizing atmosphere of the reaction shaft are exposed to a reducing atmosphere even before they get into contact with the slag layer in the settler part of the furnace, which extends from the lower end of the reaction shaft to a rise shaft. It has, namely, been noticed that the nickel oxide cannot be satisfactorily reduced if the reduction process is not started before the lower furnace (U.S. patent application Ser. No. 2471).

DESCRIPTION OF THE PREFERRED EMBODIMENTS

The process according to the invention makes it possible to produce rich nickel matte by reverbatory smelting with a new method so that, even without the known presence of large amounts of copper, smelted, iron-poor matte can be produced while the respective slags are poor enough. Thus, the method makes it possible to process nickel concentrate economically with conventional technology.

The process can be applied advantageously to pentlandite-containing — (Ni, Fe)$_9$S$_8$ — sulphidic nickel ores, the copper content of which may vary freely. Often rather small amounts of oxidic and silicated nickel minerals are present in the ores but they do not disturb the processing. This process is not recommended for pure garnierite-type — (Mg, Ni)$_3$Si$_2$O$_7$ . 2H$_2$O — nickel-iron silicate ores because the additional heat required by the processing is then very great, even though selective sulphidizing with elemental sulphur in suspension in the reaction shaft is fully possible in this case as well. It must be noted that sulphidic concentrates very poor in nickel are also very suitable to be refined by this process.

The processing of low-grade nickel-copper matte by reverberatory smelting is very analogous to the production of copper matte. A very sharp oxygen pressure gradient can be used in the reaction shaft, and the slag phase obtained from the system has a very low copper content, and the amount of trivalent iron contained in it is low. The solid matte is in this case composed of copper- and cobalt-containing pentlandite — (Fe, Ni)$_9$S$_8$ —, nickel- and iron-containing copper sulphide — Cu$_2$S — Cu$_{1.96}$S —, and iron ferrite — (Fe, Ni)$_3$O$_4$ — corresponding to the balance. When an attempt is made to improve the grade of the matte by increasing the amount of air for burning and by using slightly higher than conventional reaction shaft temperatures (1350°–1450°C), it is noted that there is a turning point in the process within the range where the pyritic and pyrrhotine iron has burned; in regard to the concentrate (6.1 percent Ni) mentioned in the examples (V), the turning point corresponds to a content of some 30–40 percent (Cu + Ni), depending on the Cu/(Cu + Ni) ratio. When the iron bound in pentlandite begins to burn, the reaction shaft no longer functions in regard to oxidation in the same manner as in the production of rich copper matte. Selective oxidation of iron is not obtained. Instead, part of the nickel is oxidized, and a considerable amount of the mainly bivalent iron is oxidized to a higher degree of oxidation (or the oxidation rate by amount of iron also decreases when the iron bound in the pentlandite is involved in the process).

Figure 1:
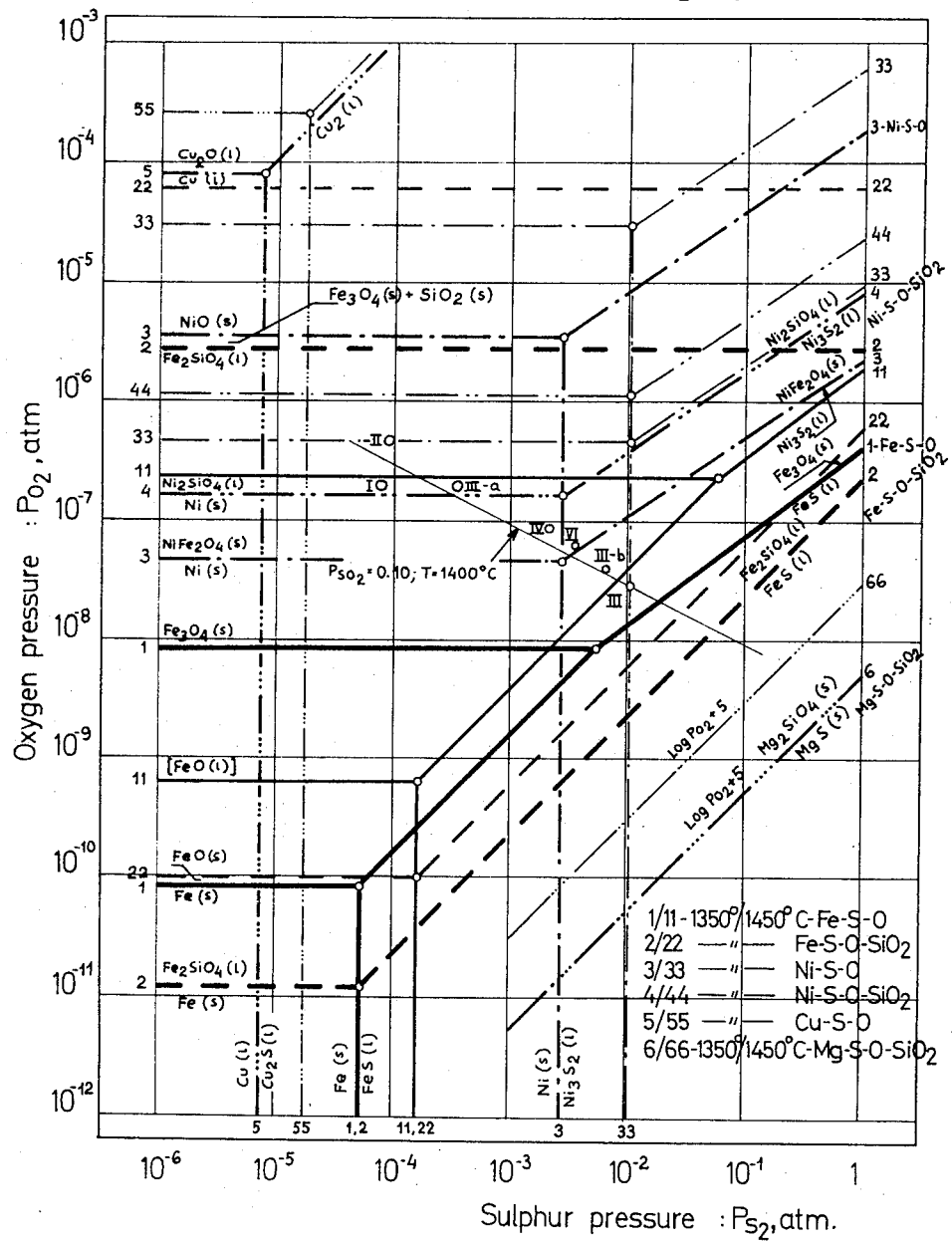
FIG. 1 shows a graph giving the stability ranges of the (Fe, Ni, Cu, Mg)—S—O—SiO$_2$ systems.

In the following, the results of the shaft reaction are observed in detail. FIG. 1 shows the calculated situation that can be expected after the reactions in regard to the components at shaft temperatures of 1350°C and 1450°C. The graph gives, as functions of the pressures of the determining components of the (post-reaction) gas phase, i.e. sulphur and oxygen, the ranges of stability of the (Cu, Ni, Fe, Mg) — S — O systems and the respective slag systems in a state of balance. In regard to the matte system, a great closeness of the ranges of iron and nickel sulphides (in regard to dissociation pressures) is noted immediately within the technically possible oxygen pressure range ($10^0 - 10^{-9}$ atm) and sulphur pressure range ($10^0 - 10^{-6}$ atm). Because of this it is very difficult to prevent the nickel sulphide from oxidizing in the selective oxidation of iron sulphides required by the process. According to the calculation, the ranges of stability of the products of oxidation are also very close to each other — intersoluble NiO · Fe$_2$O$_3$ and FeO · Fe$_2$O$_3$. When the said ranges are compared with the respective ranges of copper, it is noted that, from the sulphur pressure of some $10^{-5}$, Cu$_2$S is stable in the system so that a selective oxidation of iron is highly possible in regard to copper. Respectively, the oxide of copper, Cu$_2$O, does not become stable before high oxygen pressures. For example, at the temperature of 1350°C the difference between the ranges of stability of FeO · Fe$_2$O$_3$ and Cu$_2$O is four decades, and the difference increases with growing sulphur pressure.

According to the graph, when Ni-Cu-Fe sulphides are oxidized, it can be expected, starting from the oxygen pressure of the initial burning of the gas phase ($P_{o2}$ = 0.21 atm) in the upper part of the shaft to the oxygen pressures corresponding to the results of the reaction ($P_{o2} = 10^{-4} - 10^{-8}$ atm), that iron and nickel oxidize simultaneously (especially when pentlandite is burned, in which case Fe and Ni are present in the same crystals) into ferrites — naturally corresponding to the amount of fed oxygen — and that, respectively, copper remains in a sulphidic or metallic form within the respective range.

As to the respective slag systems, it is noted that nickel olivine and fayalite are stable in almost the same conditions. Because both nickel olivine and pure oxides have a gapless intersolubility in a smelted state, the formation of a solution is a clear fact. According to the graph, magnesium orthosilicate is stable within the entire operation range so that, considering the smelt solubility conditions, it can be expected that nickel oxide is present, dissolved, mainly in silicate solutions of the form 2(Fe, Ni, Mg)O · SiO$_2$. According to experience and theory, Cu$_2$O — even in an unstable state — appears very seldom in the $P_{o2}$ and $P_{s2}$ pressures of the operating range in question.

Thus, the product that can be expected after the shaft process in the lower furnace in the conditions used in the smelting is a silicate smelt which is composed of Fe, Ni and Mg, and in which appear dissolved feed components CaO and Al$_2$O$_3$ and an amount, corresponding to the balance, of either trivalent iron in a dissolved state or a (Ni, Fe)-ferrite separate pro-duced because of oversaturation. Copper is present in the slags as a sulphide — Cu$_{1.96}$S — or in a metallic form, depending on the grade of matte and the amounts of sulphur in the slags.

A study of the oxidation and the oxidizing reduction processes of nickel concentrate according to the method, when iron is slagged within the pentlandite range.

Two examples are studied in which the burning of the iron of nickel concentrate has taken place partly from pentlandite. The experiments were carried out with the industrial-scale smelting furnace described in the example section and in a manner similar to the experiments shown in the examples (V). 199 kg of sand were fed per one ton of concentrate, in which case the composition of the feed mixture — percentage by weight — was the following: 0.85 Cu, 3.66 Ni, 34.22 Fe, 23.75 S, 1.28 O, 25.03 SiO$_2$, and 9.36 other oxides.

During the first phase of the experiment, the oxidation of the fed concentrate was carried out so that part of the iron bound in pentlandite was oxidized (the ratio of pentlandite and total iron in the concentrate was ~0.1). In this case 10.2 kg of heavy oil and some 1391 Nm$^3$ of air (1% H$_2$O) were used per one ton of concentrate. During the second phase of the experiment, the reduction of the shaft suspension was carried out in the lower part of the shaft by using 12.7 kg of light petrol per one ton of concentrate. Statistically representative, quickly cooled samples were taken for ths study from under the reaction shaft. The oxidation and reduction of the concentrate were analyzed from these samples. The matte and slags created by the process were analyzed in the same manner. The results of the experiments, the amounts of materials, the analyses, and the distribution of the components between the phases, have been compiled in the enclosed Tables A and B. The balances of material have been calculated to correspond to an amount of 100.0 of the oxidized shaft product.

TABLE A.—MATERIAL BALANCES OF OXYDATION AND REDUCTION PROCESSES

| Sample | Amount of material | Cu | Ni | Fe | Fe$^{+3}$ | S | O | SiO$_2$ |
|---|---|---|---|---|---|---|---|---|
| Oxydation III-a: | | | | | | | | |
| Shaft sample | 100.0 | 1.00 | 4.30 | 40.2 | 17.3 | 3.6 | (13.4) | 29.4 |
| Shaft sulphide | 11.4 | 8.33 | 27.54 | 31.58 | | 31.58 | | |
| Matte | 8.4 | 10.6 | 43.3 | 16.6 | 0.9 | 27.0 | 0.6 | 0.23 |
| Slag | 91.1 | 0.29 | 0.72 | 42.6 | 5.8 | 0.58 | (13.0) | 31.4 |
| Reduction III-b: | | | | | | | | |
| Shaft sample | 99.2 | 1.01 | 4.33 | 40.5 | 12.1 | 3.8 | (12.5) | 29.6 |
| Shaft sulphide | 12.4 | 8.05 | 28.19 | 32.30 | | 30.58 | | |
| Matte | 9.1 | 10.9 | 44.2 | 15.8 | 0.9 | 26.9 | 0.6 | 0.14 |
| Slag | 90.7 | 0.14 | 0.33 | 42.8 | 4.0 | 0.6 | (12.7) | 32.0 |

TABLE B.—DIVISION OF COMPONENTS IN OXIDE AND SLAG PHASES

| Sample | Amount of material | Ni | Cu | Fe$^{+3}$ | Fe |
|---|---|---|---|---|---|
| Oxide phase of feeding mixture | 117.5 | 0 | 0 | 0.8 | 0.8 |
| Oxydation: | | | | | |
| Shaft sample | 100.0 | 27.0 | 5.0 | 43.0 | 91.4 |
| Oxide phase of matte | | 0.0 | 0.0 | 0.2 | 0.3 |
| Oxide phase of slag | | 14.9 | 0.0 | 13.1 | 96.5 |
| Slag phase | 91.1 | 15.3 | 22.8 | 13.1 | 96.5 |
| Reduction: | | | | | |
| Shaft sample | 99.2 | 18.5 | 0.0 | 29.9 | 90.0 |
| Oxide phase of matte | | 0.0 | 0.0 | 0.2 | 0.3 |
| Oxide phase of slag | | 6.5 | 0.0 | 9.1 | 93.9 |
| Slag phase | 90.7 | 6.9 | 11.5 | 9.1 | 96.4 |

Experiment A : Oxidation.

The gas phase obtained from the shaft oxidation (FIG. 2, point K$_3$) was 1318 Nm$^3$ of tn concentrate. The dry analysis of the gas phase — percentage by volume — was the following: 0.09 H$_2$, 0.18 CO, 1.54 CO$_2$, and 13.44 SO$_2$. The oxygen pressure calculated from the ratio CO$_2$/CO at the temperature of 1400°C was P$_{o2}$ = 2×10$^{-7}$ atm, and the respective sulphur pressure calculated from the material balance was P$_{s2}$ = 3.7×10$^{-4}$ atm. In the stability graph, FIG. 1, the gas phase is indicated with number III–2. According to the graph, (Ni, Fe)Fe$_2$O$_4$, Fe$_2$SiO$_4$, Ni$_2$SiO$_4$, and Mg$_2$SiO$_4$ are stable in the slag system so that the composition of the slag phase, the silicic acid being suitable, is of the form (Fe, Ni, Mg)$_2$SiO$_4$, and in the case of oversaturation, phase (Fe, Ni)O · Fe $_2$O$_3$ is also present.

A microprobe analysis of the shaft sample of the oxidized product was made and the elemental distribution of phases was seen in the positive electron graphs of X-rayograms. A spherical phase contained a great amount of Ni, Fe, and O, but Cu, S and Si were absent. The phase with a spherical shape typical of (Fe, Ni)-ferrite mixture was obviously a product of the oxidation of pentlandite. Another phase was pentlandite-type sulphide containing iron and nickel, and copper sulphide—separated from each other during solidification. A third phase was iron oxide containing silicic acid—which indicates beginning of slag formation. Quartz that had not reacted appeared as another phase.

In a solid state and in the conditions used, the slag obtained from the process has a columnar structure. The columns are formed by fayalite-containing silicates, while the spaces between the columns are Fe, Al and Ca silicates, varying in composition and often containing, like fayalites, very finely-ground sulphide dispersions and metallic copper. An electron graph showed a typical columnar-structured oxidation process, the elemental distributions of the phases of which were visible in X-rayograms. The columnar phase contains elements Fe, Ni, Si, Mg, and naturally O, and is thus, a typical silicate solution of the fayalite form.

A prismatic phase is nickel-containing iron ferrite in which the components Si and Mg are missing. Two copper phases are present. In one copper phase the shell contains sulphide separated during the solidification, and the other copper phase is completely metallic. Nickel and iron-containing sulphides were not present at the points of measurement.

From the figures in Table A it is noted that the amount of trivalent iron in the shaft product is high, 17.3 percent by weight; simultaneously it can be seen that the sulphide part of the shaft product is very rich in both iron and copper, from which the conclusion can be made that the selective oxidation of iron is difficult. From the figures in Table B it is noted that the distribution of nickel into the oxide phase of the shaft sample is already quite high, 27 percent in regard to the rather poor matte obtained — (Cu + Ni) = 53.9 percent. The figures for the slag phase, both the analysis and distribution figures, obtained from this experiment are somewhat better than ordinary. It is also noteworthy that in regard to the grade of the matte, already 91 percent of the total iron is in the oxide phase of the shaft product and 96 percent in the respective slag phase.

The microanalysis of the solid matte proved that it contained almost equal amounts of sulphide phases (Ni, Fe)$_9$S$_8$ (impurities: 0.9% Cu and Co) and Ni$_3$S$_2$ (impurities: 2.6% Fe, 1.0% Cu, and 1.2% Co). Copper was present in the matte as a sulphide, Cu$_{1.96}$S (impurities: 1% Ni and Fe). The oxide phase of the matte was nickel-containing magnetite. The amount of metal in the matte was 2.1 percent, and it was mainly nickel, which also contained precipitated metals Fe, Cu and a small amount of sulphur.

The results of oxidation experiment A indicate that the mechanism of the oxidation is in accordance with the account given above but obviously still more complicated.

Experiment B : Reduction.

The gas phase obtained from the reduction and shaft oxidation was altogether 1351 Nm$^3$/tn of concentrate. The dry analysis of the gas phase — percentage by volume — was the following: 0.32 H$_2$, 0.68 CO, 2.59 CO$_2$, and 11.90 SO$_2$. The oxygen pressure of the gas phase calculated from the ratio CO$_2$/CO at the temperature of 1400°C was P$_{o2}$ = 4×10$^{-8}$ atm, and the respective sulphur pressure calculated from the material balance was P$_{s2}$ = 7×10$^{-3}$ atm. The obtained gas phase is indicated in the stability graph with number III-b. According to the graph, Ni ferrite is no longer stable at the used temperatures so that a decomposition of (Ni, Fe)-mixture ferrite partly to a metallic and partly to a sulphidic state can be expected. The range of stability of iron oxides is corresponding to that of wustite or at least close to it so that a decrease in the amount of trivalent iron in the shaft product can be expected. Because a state of balance can obviously not be obtained in the shaft and as the activity values of the components are not known, the observations are only directive. The gas phase is still within the fayalite range; the calculation indicates that the silicate of nickel has also lost its stability — conditions of stability may, however, be such that nickel remains further as a silicate in the slags.

From Table A it can be noted that, as a result of the reduction, the amount of trivalent iron in the shaft product has decreased by 31 percent, or to 12.1 percent. The distribution of nickel (Table B) into the oxide phase of the shaft product has decreased from 27.0 percent to 18.5 percent. The amount of sulphide part of the shaft product has also increased to some extent as has its nickel (and iron) content; however, the change in the analyses is very small. The amount of matte has grown considerably and its grade improved slightly — (Cu + Ni) = 55.1 percent. The amounts of nickel and copper in the slag have greatly decreased; compared with the original the decrease of nickel is 54.5 percent and that of copper 51.9 percent. The distributions of nickel and copper into the slag phase are only 8.4 percent and 11.5 percent — the decreases are, thus, 55.0 and 49.5% — which is naturally an excellent result. Except for some slight changes in the analysis no considerable changes have occurred in the structure of the solid matte as compared with the matte in the oxidation feed. The amount of metallic phase in the matte has slightly increased (some 24 percent) but its analysis, except for a slight increase of copper, is the same as before.

The results of the reduction experiment B indicate clearly that the nickel transferred to the oxide phase in the oxidation is sulphidized selectively or reduced into metal because of the reduction. A considerable decrease of the amount of trivalent iron also takes place in the reduction before the suspension hits the smelt surface in the settler part of the furnace. The extents of the metalization and the sulphidizing are naturally dependent on the kinetic conditions of the shaft system, the delay, the distribution of fuel, and other factors, but, according to the experiments, when the process is carried out on a technical scale, a stationary state is obtained which gives very advantageous figures for the metals in the reverberatory slags.

The invention is described below in more detail with examples and with reference to the enclosed drawing which shows a device for the application of the process according to the invention.

Figure 2:
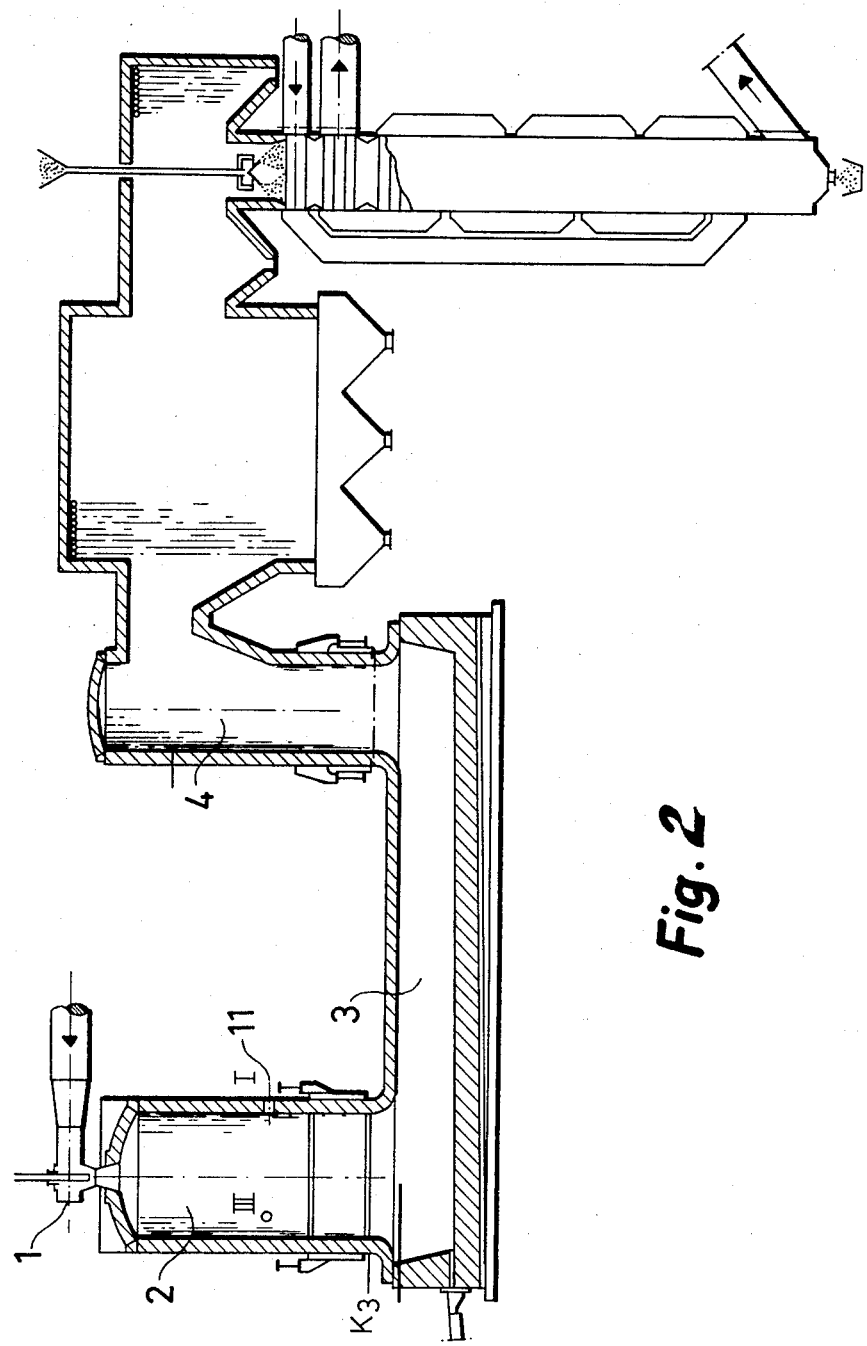
FIG. 2 shows a schematical cross-sectional side elevation of the reverbatory furnace and the heat recovery system.

An industrial-scale reverberatory smelting furnace was used in the experimental production of iron-poor nickel matte. FIG. 2 shows the entire system except the electric filter. As shown in the drawing, the furnace comprises a reaction shaft 2, a rise shaft 4, and a settler part 3 extending horizontally from below the lower end of the reaction shaft 2 to below the lower end of the rise shaft 4. The height of the reaction shaft 2 of the furnace was 8.0 m and diameter 3.9 m; the height of the settler part of the furnace 3 was 1.7 m, width 5.0 m, and length 19.5 m. The diameter of the rise shaft 4 was 2.8 m and greatest height 9.0 m. The masonry of the reaction shaft 2 and the settler part of the furnace 3 was chrome magnesite. Both the reaction shaft 2 and the settler part of the furnace 3 were provided with water cooling at conventional points. The mixture of concentrate, sand, and additives was suspended into the furnace with a conventional concentrate burner 1 by using preheated 450° air. The additional fuel of the shaft 2 was fed, raw, through the vault of the shaft. The fuel used for the reduction was conducted into the shaft through the pipes 11 indicated in the figure. Each of the three oil pipes could be used alone as well.

The gas samples and temperatures of the reaction shaft were taken at point $K_3$ (FIG. 2) or, when necessary, perpendicularly to it; the sample-taking point of the riser was $K_5$. The shaft product samples were taken with a specially constructed multipartite sample trough; the amount and rate of the cooling water of the trough were adjusted to bring about a sudden cooling of the sample. Matte and slag samples of the system were taken through the vault of the settler part of the furnace 3 with a sinkable, multipartite sample-taking device so that samples were obtained, as functions of the height, of both the slag and the matte layers of the furnace smelt simultaneously. When a stationary state was obtained in the experimental operation, representative matte and slag samples were obtained of the respective discharges as well.

The shaft, matte and slag samples were analyzed chemically with conventional methods and also physically with metallographical methods, an X-ray diffraction analyzer, and a microanalyzer. Besides the above methods in the analysis of the shaft product, brominemethanol leaching was used for the separation of the sulphide and metal phases from the oxide phases (before the actual analysis). The analsis of gases was carried out by gas chromatography and in regard to oxygen also with a continuous analyzer.

In the experimental operations according to the examples, the same raw materials were used during all the experiments. Their chemical analyses in percentages by weight were the following:

Concentrate:
  6.14 Ni; 0.65 Cu; 0.19 Co; 41.30 Fe; 0.014 Zn; 0.010 Pb; 29.60 S; 1.48 O; 0.33 C; 0.07 H; 11.70 $SiO_2$; 1.34 CaO; 3.65 MgO; 1.60 $Al_2O_3$; and 0.99 BaO, $K_2O$, $Na_2O$, etc.

Cu-Ni residue:
  18.80 Ni; 42.10 Cu; 0.24 Co; 1.10 Fe; 14.60 S; 9.97 O; 4.40 $SiO_2$; 0.17 CaO; 0.40 MgO; and 6.35 BaO, $K_2O$, $Na_2O$, etc.

Sand:
  2.43 $Fe_2O_3$; 89.00 $SiO_2$; 0.50 CaO; 0.30 MgO; 5.00 $Al_2O_3$.

Oil:
  2.50 Si; 85.00 C; 11.80 H; 0.10 $H_2O$.

Light petrol:
  84.00 C; 16.00 H.

The series of experiments obtained by measurements (Examples I–IV) are studied in this connection. They differ from each other mainly as follows:

Example I. In this experiment, ordinary poor matte was smelted in order to obtain a basis of comparison for other smeltings.

Example II. Production of rich nickel matte was carried out with the normal method in this experiment.

In the series of experiments according to Examples III–IV, reduction of oxidized shaft product obtained by the conventional method was carried out in suspension with light petrol.

The series of experiments according to Examples V–VI were carried out in a manner similar to series II–IV. The operations deviated from those mentioned previously only in that the Cu/(Cu + Ni) ratio of the feed concentrate was 0.3 in the former and 0.1 in the latter.

In order to have the desired amount of copper in the feed mixture, leaching residue to be returned to the conventional smelting process was added to it from the leaching system of the nickel factory. The amounts and analyses of the flying dust product and the flying dust returned to the system in the feed mixture given in the examples deviate from each other in a stationary state only in regard to the sulphur and oxygen analyses (and amounts). This is due to the fact that the dust was partly oxidized, either by sulphating or otherwise, in the boiler part of the system constructed for poor matte (where air was fed for sooting, etc.). In the series of experiments according to Examples VII and VIII the influence on slag reduction of the temperature of the sulphide produced by partial reduction was studied. The conditions were the same as in experiments II–IV but flying dust was not returned to the system.

EXAMPLE I

The analysis of the feed mixture of the experiment in percentages by weight was the following: 6.01 Ni, 2.73 Cu, 0.17 Co, 34.36 Fe, 24.28 S, 2.64 O, and 20.70 $SiO_2$. The experimental period was about 10 days, and the total amount of concentrate used was 2200 tn, which corresponded to a feeding rate of 9.04 tn/h. The amounts (calculated per one ton of concentrate) and analyses of the solid products obtained from the system in the experiment are given in Table I, the amounts and analyses of the gas phases of the reaction shaft and the riser in Table 2, and the temperature balances corresponding to the furnace parts in Table 3 (which also gives the amounts of the feed components).

The sulphide analysis of the shaft product indicated that it contained the following percentages of the nickel, copper, and cobalt of the feed: 84, 100, and 25. The sulphides were structurally of the form $FeS_x$, (Fe, $Ni)_9S_8$, and $Cu_{1.96}S$. The metal distributions of the matte phase were the following: nickel 91 percent and copper 89 percent. The structure of the solid matte was the following: the matrix was pentlandite with a separate of iron-containing copper sulphide and nickel-containing iron ferrite. Some 4 percent was metallic phase, which was iron-, copper- and cobalt-containing nickel.

The amount of trivalent iron in the slag was low (6.48 percent), and its nickel and copper contents also corresponded to the delay periods (0.78% Ni and 0.41% Cu). Let it be mentioned that the slag values obtained in normal operation for the same grade of matte, Cu + Ni = 42 percent, vary for nickel from 0.3 to 0.6% Ni and for copper from 0.3 to 0.4% Cu so that the result of the series of experiments is slightly poorer than normal. 8.6 percent of the nickel contained in the slag was in iron sulphide of the pentlandite form and the rest in fayalite and ferrite phases. The degree of oxidation of the exhaust gases of the reaction shaft was normal. The heat balances calculated for both the reaction shaft and the rest of the furnace corresponded to the degree of accuracy of the measurements. Let it be mentioned, however, that the degree of accuracy of the temperatures given in the balances was ± 20²C.

EXAMPLE II

In this experiment, iron-poor nickel matte was produced with the same smelting method as in the previous example. The amount of air and sand was increased to correspond to the grade of the matte; the temperature was also increased by some 50°C. The analysis of the feed mixture in percentages by weight was the following: 5.85 Ni, 2.62 Cu, 0.16 Co, 33.34 Fe, 23.32 S, 2.71 O, and 22.82 $SiO_2$. The amount of concentrate used during the experimental period was some 2000 tn, which corresponded to a feeding rate of 8.43 tn/h.

The results obtained from the experiment are given in Tables 1, 2, 4, and 8.

A considerable amount of trivalent iron (19.8 percent) is noted from the analysis of the shaft product, which agrees with the previous explanation — the differences in the delay periods required for the oxidation of different sulphides. The analysis of the shaft sulphide indicates that it contains only 47.8 percent of the fed nickel, the respective distributions of copper and cobalt being 96.1 and 20.2 percent. In a solid state the shaft sulphide contained, in addition to 3/2 sulphide of nickel, pentlandite — (Fe, $Ni)_9S_8$.

The nickel and copper distributions of the matte phase were 40.4 percent and 57.8 percent so that the total amount of matte was low. Owing to the different distributions of copper and nickel the Cu/(Cu + Ni) ratio of the matte rose to 0.39 in comparison with the 0.30 in the feed mixture, and in the slag phase it dropped to 0.23. In a solid state the matte phase (Cu + Ni = 75.5 percent) contained impure sulphides $Ni_3S_2$ and $Cu_{1.96}S$ and some magnetite and, in addition, some 8.5 percent metal mixture phase containing mainly nickel and copper.

According to Table 1, the slag phase contained 4.27 percent nickel and 1.31 percent copper and, because it also contained a great amount of trivalent iron (8.3 percent), it was very disadvantageous. Only some 1 percent of the nickel contained in the slag phase was in its sulphide part, the nickel content of the ferrite phase was some 2 percent and that of the fayalite phase always somewhat greater. The copper contained in the slags was almost completely in the form of very finely-ground metal drops, which were obviously prevented from joining and sinking by the high slag viscosity and other reasons.

According to Table 2, the oxygen pressure of the gas phase at the lower end ($K_3$) of the shaft was relatively low (some dispersion did occur), which, as such, does not mean anything because the shaft product was only in a stationary state but not in a balance regarding the gas phase. The gas phase of the settler part of the furnace was, however, closer to a state of balance in regard to the slag components and the previous phase.

EXAMPLES III AND IV

During this experimental period shaft produce in suspension and gas phase, both obtained according to Example II, were reduced with light petrol. The amounts fed and the feeding rates per hour were the same as in the previous experiment. The analysis of the feed mixture in percentages by weight was the following: 5.81 Ni, 2.59 Cu, 0.16 Co, 33.31 Fe, 23.42 S, 2.58 O and 22.93 $SiO_2$.

The fuel needed for the reduction was fed into the furnace area during the first phase of the experiment (Example III) through all the three feeding pipes (11; see FIG. 2). The weights, analyses, metal distributions, etc., and the heat balance obtained from the experiment, are given in Tables 1, 2, 5, and 8.

According to the tables, the amount of trivalent iron in the shaft product had decreased as a result of the reduction. The analysis of the shaft sulphide indicated that the distributions of nickel, copper and cobalt into this phase were 65.6, 99.4, and 53.0 percent. The considerable increase of, for example, nickel in comparison with the previous experiment is obviously a consequence of its selective sulphidizing. In a solid state no observable amounts of metal phase was present in the shaft sulphide, but, in addition to 3/2 nickel sulphide, it contained a considerable amount of pentlandite, owing to which the sulphur content of the shaft sulphide was very high.

A considerable increase (94 percent) in comparison with the oxidation process had taken place in the amount of matte. The contents in the matte (Cu + Ni = 74.5 percent and Fe = 1.7 percent) had remained practically unchanged. Instead, some change had occurred in the ratio of nickel and copper, which can be attributed to the change in the metal distributions as a result of the reduction. The distributions of nickel and copper into the matte phase were high, or 86.5 percent and 88.4 percent calculated from the total content of the respective metals in matte and slag; the Cu/(Cu + Ni) ratio of matte was 0.31 (in Example II: 0.39) and the respective ratio in the slag was 0.28. The structure of the solid matte corresponded to that in the previous experiment.

The contents of trivalent iron, nickel, and copper in the slag phase were very low (4.36% $Fe^{+3}$, 1.03% Ni, and 0.39% Cu). The sulphur content in the slag had approximately tripled in comparison with the oxidation process. The nickel content in the sulphide phase of the slag was, however, still very low. Most of the nickel was, according to the slag analysis, in both the separated iron ferrite (0.21–0.87% Ni) and fayalites (0.53–1.04% Ni). The copper in the slags was still mainly metallic, even though sulphides, also, were present locally.

It can be noted from the figures of Table 2 that the oxygen pressure of the gas phase coming from the reaction shaft after reduction was relatively low — even the presence of $H_2S$ and COS could be verified — so that the separation and partial sulphidizing of ferrites is a clear fact if the delay period is long enough. The gas phase of the riser was conducted to the lower furnace with the feeding of additional fuel and air so that the degree of oxidation of the gases increased only to the extent sufficient to prevent the after-oxidation of the slag in the lower furnace. The respectively generated reaction heat decreased the need for fuel in the lower furnace.

The control of the stationary state of the reduction process succeeded well, which can be noted from the heat balances of Table 5. The aim of the series of total reduction experiments described above was that a good mixing of the reduction material in suspension, as well as a respective lowering of the total oxygen pressure in the gas phase, decomposition of ferrites, and sulphidizing of nickel in suspension, would occur. Of the amount of reduction fuel used in this case less than 38 percent was used for the actual treatment of the suspension and most of it, or over 62 percent, was used for the mere gas treatment.

It is a known fact that it is very difficult to disturb the state of movement adopted by a relatively viscous gas flow at a high temperature by using gas or other flows from the side. An attempt was made to make use of this quality of the gas flow in reduction by piercing the suspension flow deeply enough with a reduction material spray directed with sufficient force without even trying to make the reduction material or gases created from it to mix considerably with the suspension flow. In this partial reduction experiment according to Example IV, only one of the feeding pipes (11) was used for reduction material. After the completed preliminary experiments practically the same result was obtained in a stationary state with an amount of fuel 76 percent of which was used for the treatment of the suspension and only 24 percent for the gas phase as in the total reduction. The obtained result indicated that a highly reducing gas phase produced because of weak mixing in a limited area sulphidizes from the suspension a sulphide phase large enough so that the decomposition of ferrite and the sulphidizing of the still unsulphidized nickel oxide can be carried out in the very advantageous mixing and reaction conditions of the collision zone of the suspension and the settler part smelt before the slagging of the nickel. Let it also be noted that after the nickel oxide has been bound into the (Fe, Mg, Ni)-silicate phase, reduction cannot be obtained with the temperatures and allowed delay periods of the reactions in this technology, for example, with smelted iron sulphide. Compared with the previous total reduction process it can also be noted regarding the obtained result that in the conditions used the reduction of suspension obtained with good mixing and, respectively, with a dilute gas mixture is of the same degree as the partial reduction — strong gas mixture — and, thus, also, that the change in the suspension in reduction requires a different delay period than, for example, the respective reduction of the gas phase. In the short series of experiments, when partial reduction was used, the only essential changes were the lowering of the sulphide content of the flying dust and, according to the heat balance (Table 6), the increase of the amount of fuel when the series was carried out in the same conditions as were used in the total reduction.

When partial reduction is used, it must be noted, however, that a sufficient preliminary testing must be carried out concerning the control of the process in order than an undisturbed operation and removal of decomposed products is obtained, especially when the oxygen pressure of the reaction shaft gases is great after the oxidation.

EXAMPLES V AND VI

In the series of experiments according to Examples V and VI, the oxidations and oxidating reductions were carried out according to Examples II and III by using the same concentrate but leaving out the Cu-Ni residue addition from the feed mixture. The length of both experimental periods of the series of experiments was about five days, and the total amount of concentrate used in each series was some 950 tn, which corresponded to a feeding rate of concentrate of 8 tn/h. The analysis of the feed mixture in percentages by weight was the following: 5.24 Ni, 0.56 Cu, 0.16 Co, 34.94 Fe, 23.65 S, 2.15 O, and 24.09 $SiO_2$.

The results of the series of oxidation experiments (Example V) are given in Tables 1, 2, and 8.

According to the results, the amount of trivalent iron in the shaft product (15.7 percent) was somewhat lower than that obtained in experiment II. The distributions of nickel. copper, and cobalt into the shaft sulphide was 41.4 percent, 92.0 percent, and 28.4 percent. In a solid state the shaft sulphide was of the same structure as that obtained previously (II).

Compared with experiment II, the obtained amount of matte was lower (because the copper content of the feed was low). The grade of the matte (Cu + Ni = 72.3 percent) was also slightly lower than previously; in a solid state its structure was, however, the same. The amount of sulphide ($Cu_{1.96}S$) was, however, lower and also the copper content of the metal mixture phase lower than previously (II). The distributions of nickel and copper into the matte phase were 44.2 percent and 50.5 percent so that the difference between the distributions was lower than in the previous experiment and, thus, the Cu/(Cu + Ni) ratio more corresponding to the feed mixture. The obtained slag phase was analogous to the slag phase of the oxidation experiment II, but its copper and nickel contents were lower than previously, or 0.32% Cu and 3.45% Ni. In the reduction experiment described in this connection (Example VI) the reduction was carried out by the partial reduction process. The suspension's need for reduction was not as great as in Examples II and IV so that proportionately more fuel was used for the treatment of the gas phase than previously (IV).

The results obtained from the experiment are given in tables 1, 2, 7, and 8. According to Table 1, there was a slight decrease in the amount of trivalent iron in the shaft product (14 percent). Let it be noted that when partial reduction is carried out with one burner it is very difficult to get a statistically representative sample of the shaft product. In this case a sample was taken from below feeding pipe 11 for the analysis of the sulphide structure. After this, the shaft product was reproduced on the basis of the balance analyses and amounts of materials. It was, however, easier to obtain a gas phase sample and flying dust samples with sufficient accuracy after $K_3$ with a suitable air and fuel interruption in the lower furnace.

The greatest changes in the results of the experiment in comparison with the oxidation experiment were in the amounts and analyses of the final products. According to Table 8, the distributions of nickel and copper into the matte phase were 86.0 percent and 90.1 percent and, thus, very advantageous. On the basis of the changes in the distributions the amount of the matte phase also increased by 90.5 percent in comparison with the oxidation (V), and its Cu/(Cu + Ni) ratio lowered to correspond well to the feed mixture. In a solid state the structure of the matte corresponded to the previous results and increase could be noted only in the amount of its metal mixture. The gas phase with its low nickel and copper contents (0.91 percent and 0.07 percent) is very advantageous, if the high grade of matte is taken into consideration (Cu + Ni = 73.1 percent). The gas and heat balances of the system (Tables 2 and 7) correspond to a stationary state and are analogous to the balances of Examples II and IV.

On the basis of Examples V and VI it can be noted that the decrease in the amount of copper in the feed mixture will at least not make the result worse. According to this and other series of experiments, copper has no noteworthy significance when the method is applied at the temperatures used or higher.

EXAMPLES VII AND VIII

In the short series of experiments according to Examples VII and VIII, the oxidation according to Example II was carried out first and then a partial reduction of the shaft product (Example VIII) within a very limited area of the cross section of the shaft at an increased temperature. The experiment was carried out without returning the flying dust into the system to improve the feed analysis accuracy. The length of each of the experimental periods was some two days, and the total amount of concentrate used was some 500 tn, which corresponded to a feeding rate of concentrate of 9.5 tn/h. The analysis of the feed mixture in percentages by weight was the following: 5.79 Ni, 2.53 Cu, 0.16 Co, 33.23 Fe, 24.28 S, 1.77 O, and 23.36 $SiO_2$.

The results of the series of oxidation experiments are given in Tables 1, 2, 8, and 10. The results correspond to those previously obtained. The distributions of nickel and copper into the shaft sulphide were 40.0 percent and 85.0 percent and to the sulphide matte, respectively, 55.0 percent and 33.0 percent.

In the series of reduction experiments shown in Example VIII (results in Tables 1, 2, 9, and 10) the reduction was carried out with a very small amount of fuel, but, in addition, the temperature of the created sulphide suspension was increased — in order to increase the reduction activity — by feeding into it, in addition to the required light petrol, pure oxygen directed into the spray from above the feeding pipe. Thus, a well limited reduction area was obtained in a stationary state in the lower part of the reaction shaft. The exchange of both material and energy between this area and its surroundings was very low, as could be expected. The samples taken with an iron rod from the reduction zone in the lower part of the shaft represented a sulphidic product (differential analysis), the analysis variation of which was the following: Fe: 30–60 percent, Ni: 20–7 percent, Cu: 20–2 percent, and S: 27–33 percent — iron-rich sulphides. The gas analyses obtained from the zone indicated a low oxygen pressure and, respectively, low $SO_2$ contents and relatively high $H_2S$ and COS contents. Simultaneously, the conditions outside the reduction zone correspond, on the basis of the temperature and the samples to the products of oxidation. The analyses of shaft products in Tables 1, 2, and 9 have been calculated on the basis of the products obtained from the furnace (matte, slag, flying dust) and on the basis of the gas analyses of the risers, because sufficiently accurate samples and temperatures could not be obtained from the system with the scale used.

From the results of the partial reduction it can be seen that the partial sulphide suspension at an increased temperature has caused a very advantageous metal distribution and slag analysis values in more oxidizing shaft conditions than used in the previous experiments.

When the sulphur and oxygen pressure values obtained in the experiments according to Examples I–VIII are placed in the field of stability of FIG. 1, all the presented results of the oxidation and reduction experiments agree well with the previously given explanation. Also, the results of the study of the structure of the solid state of the final products presuppose smelt phase structures within the ranges of stability even though the lack of activity values prevents a more detailed study of the mechanism and balance. On the basis of the ranges of stability of FIG. 1 it is easy to estimate the extent of the processing field which the developed process makes possible. The applications according to the given examples cover only a fraction of the available scope. If the high temperatures and units with a really great capacity are taken into consideration, the limits of the application of the method cannot even be guessed.

For an experienced professional man it is clear without saying that the examples have been used to illustrate only the mechanism of the process with very simple methods. In regard to the actual reduction technology, the possibilities are most numerous. The examples present only the extreme limits of reduction — partial/total — that can be easily carried out with the used technological equipment. Naturally, within these limits as such, a great number of applications are possible as are also within the very extensive range provided by the variation of the oxygen potential of the post-oxidation gas phase.

TABLE 1.—MATERIAL BALANCES OF THE PROCESSES

| Component example | Amount of material, kg./t. | Weighed analysis, weight percent | | | | | | |
|---|---|---|---|---|---|---|---|---|
| | | Cu | Ni | Fe | $Fe^{+2}$ | Co | S | O | $SiO_2$ |
| Example I: | | | | | | | | | |
| Shaft product | 1,118.2 | 3.09 | 6.80 | 38.90 | 9.95 | 0.19 | 6.55 | (11.09) | 23.44 |
| Matte | 225.0 | 12.60 | 29.40 | 28.30 | | 0.50 | 25.84 | 3.52 | 0.15 |
| Slag | 834.0 | 0.41 | 0.78 | 42.27 | 6.48 | 0.11 | 1.01 | (12.77) | 30.31 |
| Flying dust | 50.0 | 5.50 | 6.74 | 37.46 | 6.02 | 0.18 | 4.85 | | 17.80 |
| Example II: | | | | | | | | | |
| Shaft product | 1,163.7 | 2.96 | 6.82 | 37.70 | 19.77 | 0.18 | 2.50 | (14.19) | 25.81 |
| Matte | 52.8 | 29.20 | 46.30 | 1.50 | | 0.40 | 22.05 | 0.28 | 0.15 |
| Slag | 1,022.0 | 1.31 | 4.27 | 40.71 | 8.28 | 0.18 | 0.15 | (14.00) | 28.63 |
| Flying dust | 56.0 | 4.83 | 7.79 | 38.88 | 23.52 | 0.18 | 2.17 | | 12.71 |
| Example III: | | | | | | | | | |
| Shaft product | 1,173.5 | 2.90 | 6.49 | 37.21 | 18.52 | 0.18 | 5.30 | (12.16) | 25.62 |
| Matte | 122.0 | 23.00 | 51.50 | 1.71 | | 0.55 | 22.63 | 0.21 | 0.28 |
| Slag | 957.0 | 0.39 | 1.03 | 43.35 | 4.36 | 0.14 | 0.58 | (13.09) | 38.42 |
| Flying dust | 55.0 | 4.09 | 6.25 | 35.85 | 4.32 | 0.17 | 17.23 | | 16.70 |
| Example V: | | | | | | | | | |
| Shaft product | 1,106.0 | 0.64 | 5.95 | 39.67 | 15.72 | 0.18 | 2.13 | (14.18) | 27.36 |
| Matte | 42.1 | 7.80 | 64.50 | 2.50 | 0.42 | 0.55 | 24.21 | 0.35 | 0.10 |
| Slag | 992.0 | 0.32 | 3.45 | 41.87 | 7.95 | 0.17 | 0.23 | (14.00) | 29.73 |
| Flying dust | 52.0 | 1.06 | 8.46 | 43.08 | 17.07 | 0.19 | 2.80 | | 14.62 |
| Example VI: | | | | | | | | | |
| Shaft product | 1,108.0 | 0.64 | 5.94 | 39.60 | 13.44 | 0.18 | 3.16 | (13.26) | 27.31 |
| Matte | 80.2 | 7.30 | 65.80 | 2.71 | | 0.80 | 23.41 | 0.30 | 0.12 |
| Slag | 951.0 | 0.07 | 0.91 | 43.56 | 4.46 | 0.17 | 0.62 | (13.07) | 31.00 |
| Flying dust | (52.0) | (1.06) | (8.43) | (43.08) | (17.07) | (0.19) | (2.80) | | (14.62) |
| Example VII: | | | | | | | | | |
| Shaft product | 1,105.0 | 2.87 | 6.58 | 37.74 | 16.60 | 0.19 | 2.36 | 14.04 | 26.53 |
| Matte | 52.0 | 30.27 | 41.77 | 3.78 | | 0.04 | 23.38 | 0.29 | 0.20 |
| Slag | 945.0 | 1.36 | 4.67 | 40.43 | 9.63 | 0.19 | 0.16 | 14.21 | 29.45 |
| Flying dust | 90.0 | 3.50 | 7.63 | 38.65 | 16.28 | 0.22 | 3.66 | 12.90 | 16.58 |
| Example VIII: | | | | | | | | | |
| Shaft product | 1,112.0 | 2.86 | 6.54 | 37.50 | 14.98 | 0.18 | 4.26 | 12.66 | 26.37 |
| Matte | 113.0 | 21.40 | 50.37 | 3.24 | | 0.33 | 24.32 | 0.29 | 0.65 |
| Slag | 898.0 | 0.55 | 1.12 | 42.97 | 4.68 | 0.17 | 0.45 | 13.11 | 31.28 |
| Flying dust | 75.0 | (3.50) | (7.63) | (36.65) | | (0.22) | | | (16.58) |

TABLE 2.—GAS BALANCES OF THE PROCESSES

| Example sampling point | Volume, Nm.³/t. | Oxygen pressure, atm. | Temperature, °C. | Gas analysis, volume percent | | | | |
|---|---|---|---|---|---|---|---|---|
| | | | | $H_2$ | CO | $CO_2$ | $H_2O$ | N |
| Example I: | | | | | | | | |
| Shaft | 1,361 | $1.9 \times 10^{-7}$ | 1,350 | 0.08 | 0.21 | 3.28 | 12.52 | 83.91 |
| Rising tube | 1,783 | $4.5 \times 10^{-8}$ | 1,275 | 0.11 | 0.28 | 5.95 | 9.80 | 83.87 |
| Example II: | | | | | | | | |
| Shaft | 1,388 | $4.4 \times 10^{-7}$ | 1,400 | 0.05 | 0.08 | 0.99 | 14.28 | 84.60 |
| Rising tube | 2,200 | $2.4 \times 10^{-6}$ | 1,350 | 0.04 | 0.10 | 5.79 | 9.88 | 84.19 |
| Example III: | | | | | | | | |
| Shaft | 1,444 | $2.9 \times 10^{-8}$ | 1,400 | 0.47 | 0.96 | 3.20 | 10.69 | 84.59 |
| Rising tube | 2,431 | $9.4 \times 10^{-8}$ | 1,350 | 0.23 | 0.64 | 7.01 | 8.20 | 83.93 |
| Example IV: | | | | | | | | |
| Shaft | 1,413 | $8.3 \times 10^{-8}$ | 1,400 | 0.20 | 0.40 | 2.22 | 12.63 | 84.56 |
| Rising tube | 2,417 | $9.4 \times 10^{-8}$ | 1,350 | 0.22 | 0.63 | 6.91 | 8.52 | 83.72 |
| Example V: | | | | | | | | |
| Shaft | 1,377 | $3.9 \times 10^{-7}$ | 1,415 | 0.06 | 0.10 | 1.18 | 14.27 | 84.39 |
| Example VI: | | | | | | | | |
| Shaft | 1,410 | $6.0 \times 10^{-8}$ | 1,410 | 0.24 | 0.50 | 2.34 | 12.87 | 84.05 |
| Rising tube | 2,320 | $6.6 \times 10^{-8}$ | 1,350 | 0.25 | 0.72 | 6.68 | 8.83 | 83.62 |
| Example VIII: | | | | | | | | |
| Shaft | 1,225.8 | | 1,452 | | | 0.46 | 15.15 | 84.39 |
| Reduction zone [1] | 207.7 | $1.82 \times 10^{-8}$ | 1,600 | 12.08 | 19.94 | 7.35 | 0.43 | 59.56 |
| Rising tube | 2,024.0 | $7.0 \times 10^{-8}$ | 1,390 | 0.25 | 0.66 | 5.54 | 9.94 | 88.81 |

[1] Calculation on the basis of balance results.

TABLE 3.—HEAT BALANCE FOR PROCESS I

| | Example I: normal, poor matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t |
| In: | | | | | | |
| Concentrate | 25 | 1,000.0 | 978.8 | | | |
| Cu-Ni-residue | 25 | 60.0 | 15.4 | | | |
| Flying dust | 25 | 56.0 | −13.3 | | | |
| Sand | 25 | 150.0 | −1.6 | | | |
| Shaft product | | | | 1,350 | 1,118.5 | 550.7 |
| Gas phase | | | | 1,350 | 1,360.6 | 697.0 |
| Oil | 25 | 24.9 | 241.5 | 25 | 37.1 | 359.4 |
| Light petrol | | | | | | |
| Air | 450 | 1,401.7 | 191.5 | 25 | 396.1 | |
| In, total | | | 1412.3 | | | 1,607.1 |
| Out: | | | | | | |
| Shaft product | 1,350 | 1,118.5 | 550.7 | | | |
| Matte | | | | 1,150 | 225.0 | 260.6 |
| Slag | | | | 1,250 | 834.0 | 303.3 |
| Flying dust | | | | 1,275 | 50.0 | 25.8 |
| Gas phase | 1,350 | 1,360.6 | 697.0 | 1,275 | 1,782.7 | 863.8 |
| Losses of heat | | | 166.6 | | | 148.1 |
| Out, total | | | 1,414.3 | | | 1,601.1 |
| Difference | | | −2.0 | | | 6.0 |

TABLE 4.—HEAT BALANCE FOR PROCESS II

| | Example II: Oxidation, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| In: | | | | | | |
| Concentrate | 25 | 1,000.0 | 978.8 | | | |
| Cu-Ni-residue | 25 | 60.0 | 15.4 | | | |
| Flying dust | 25 | 81.0 | −17.3 | | | |
| Sand | 25 | 195.0 | −2.1 | | | |
| Shaft product | | | | 1,400 | 1,163.7 | 322.2 |
| Gas phase | | | | 1,400 | 1,388.3 | 726.3 |
| Oil | 25 | 5.2 | 50.6 | 25 | 67.7 | 656.7 |
| Light petrol | | | | | | |
| Air | 450 | 1,471.6 | 201.6 | 25 | 754.4 | |
| In total | | | 1,227.0 | | | 1,705.2 |
| Out: | | | | | | |
| Shaft product | 1,400 | 1,163.7 | 322.2 | | | |
| Matte | | | | 1,275 | 62.8 | 71.5 |
| Slag | | | | 1,340 | 1,022.0 | 350.8 |
| Flying dust | | | | 1,350 | 56.0 | 8.3 |
| Gas phase | 1,400 | 1,388.3 | 726.3 | 1,350 | 2,200.2 | 1,118.6 |
| Losses of heat | | | 180.0 | | | 160.0 |
| Out total | | | 1,228.5 | | | 1,709.2 |
| Difference | | | −1.5 | | | −4.0 |

TABLE 5.—HEAT BALANCE FOR PROCESS III

| | Example III: Oxidation-reduction, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| In: | | | | | | |
| Concentrate | 25 | 1,000.0 | 978.8 | | | |
| Cu-Ni-residue | 25 | 60.0 | 15.4 | | | |
| Flying dust | 25 | 58.0 | −16.5 | | | |
| Sand | 25 | 193.0 | −2.1 | | | |
| Shaft product | | | | 1,400 | 1,171.0 | 403 |
| Gas phase | | | | 1,400 | 1,444.0 | 931 |
| Oil | 25 | 5.2 | 50.6 | 25 | 72.8 | 706 |
| Light petrol | 25 | 26.9 | 287.4 | | | |
| Air | 450 | 1,469.5 | 200.7 | 25 | 947.0 | |
| In total | | | 1,514.3 | | | 2,041 |

TABLE 5.—HEAT BALANCE FOR PROCESS III — Continued

| | Example III: Oxidation-reduction, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| Out: | | | | | | |
| Shaft product | 1,400 | 1,171.0 | 403.8 | | | |
| Matte | | | | 1,250 | 122.0 | 141.0 |
| Slag | | | | 1,300 | 957.0 | 415.0 |
| Flying dust | | | | 1,350 | 55.0 | 49.8 |
| Gas phase | 1,400 | 1,444.0 | 931.1 | 1,350 | 2,430.6 | 1,284.3 |
| Losses of heat | | | 180.0 | | | 160.0 |
| Out total | | | 1,514.9 | | | 2,050.1 |
| Difference | | | −0.6 | | | −9.0 |

TABLE 6.—HEAT BALANCE FOR PROCESS III

| | Example IV: Oxydation, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| In: | | | | | | |
| Concentrate | 25 | 1,000.0 | 978.8 | | | |
| Cu-Ni-residue | 25 | 60.0 | 15.4 | | | |
| Flying dust | 25 | 58.0 | −16.5 | | | |
| Sand | 25 | 193.0 | −2.1 | | | |
| Shaft product | | | | 1,400 | 1,171.0 | 403.8 |
| Gas phase | | | | 1,400 | 1,412.9 | 780.5 |
| Oil | 25 | 5.2 | 50.6 | 25 | 84.3 | 817.7 |
| Light petrol | 25 | 13.5 | 144.1 | | | |
| Air | 450 | 1,469.5 | 200.7 | 25 | 935.6 | |
| In total | | | 1,371.0 | | | 2002.0 |
| Out: | | | | | | |
| Shaft product | 1,400 | 1,171.0 | 403.8 | | | |
| Matte | | | | 1,250 | 122.0 | 141.0 |
| Slag | | | | 1,300 | 957.0 | 415.0 |
| Flying dust | | | | 1,350 | 52.5 | 7.8 |
| Gas phase | 1,400 | 1,412.9 | 780.5 | 1,350 | 2,416.5 | 1,276.8 |
| Losses of heat | | | 180.0 | | | 160.0 |
| Out total | | | 1,364.3 | | | 2,000.6 |
| Difference | | | 6.7 | | | 1.4 |

TABLE 7.—HEAT BALANCE FOR PROCESS VI

| | Example VI: oxydation-reduction, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| In: | | | | | | |
| Concentrate | 25 | 1,000.0 | 978.8 | | | |
| Flying dust | 25 | 56.0 | −14.3 | | | |
| Sand | 25 | 200.0 | −2.1 | | | |
| Shaft product | | | | 1,410 | 1,108.0 | 371.6 |
| Gas phase | | | | 1,410 | 1,404.6 | 809.6 |
| Oil | 25 | 7.0 | 67.9 | 25 | 76.5 | 742.1 |
| Light petrol | 25 | 13.5 | 144.1 | | | |
| Air | 450 | 1,452.1 | 198.3 | | | |
| In total | | | 1,372.7 | | | 1,923.3 |
| Out: | | | | | | |
| Shaft product | 1,410 | 1,108.0 | 371.6 | | | |
| Matte | | | | 1,250 | 80.2 | 108.1 |
| Slag | | | | 1,300 | 951.0 | 412.8 |
| Flying dust | | | | 1,350 | 52.0 | 15.5 |
| Gas phase | 1,410 | 1,409.8 | 809.6 | 1,350 | 2,320.1 | 1,236.8 |
| Losses of heat | | | 180.0 | | | 160.0 |
| Out total | | | 1,361.2 | | | 1,933.2 |
| Difference | | | 11.5 | | | 9.9 |

TABLE 8.—HEAT BALANCE FOR PROCESS VII

| | Example VII: Oxydation, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| n: | | | | | | |
| Concentrate | 25 | 1,000.0 | 978.8 | | | |
| Cu-Ni-residue | 25 | 60.0 | 15.4 | | | |
| Sand | 25 | 195.0 | −2.1 | | | |
| Shaft product | | | | 1,452 | 1,105.0 | 297.8 |

TABLE 8.—HEAT BALANCE FOR PROCESS VII—Continued

| | Example VII: Oxydation, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| Gas phase | | | | 1,452 | 1,350.3 | 734.2 |
| Oil | | | | 25 | 53.3 | 517.6 |
| Light petrol | | | | | | |
| Air | 450 | 1,433.1 | 195.7 | 25 | 580.0 | |
| In total | | | 1,187.8 | | | 1,549.6 |
| Out: | | | | | | |
| Shaft product | 1,452 | 1,105.0 | 297.8 | | | |
| Matte | | | | 1,250 | 52.0 | 58.4 |
| Slag | | | | 1,350 | 945.0 | 314.6 |
| Flying dust | | | | 1,350 | 90.0 | 30.3 |
| Gas phase | 1,452 | 1,350.3 | 734.2 | 1,350 | 2,069.3 | 990.2 |
| Losses of heat | | | 156.0 | | | 156.0 |
| Out total | | | 1,188.0 | | | 1,549.5 |
| Difference | | | −0.2 | | | 0.1 |

TABLE 9
Division of nickel, copper and iron to sulphide matte in different processes.

| Example process | Division—% | | |
|---|---|---|---|
| | Ni | Co | Fe |
| Example I, normal | | | |
| A | 87,0 | 82,2 | 14,6 |
| B | 91,0 | 89,3 | 15,3 |
| Example II, oxidation | | | |
| A | 37,8 | 53,2 | 0,21 |
| B | 40,0 | 57,8 | 0,23 |
| Example III, reduction | | | |
| A | 82,5 | 82,5 | 4,8 |
| B | 86,5 | 88,4 | 5,0 |
| Example V, oxidation | | | |
| A | 41,3 | 46,5 | 0,24 |
| B | 44,2 | 50,8 | 0,26 |
| Example VI, reduction | | | |
| A | 80,2 | 83,1 | 0,50 |
| B | 85,9 | 90,1 | 0,56 |

A: Division takes into account the flying dust
B: Division takes into account only matte and slag concentrate, and including separating gases and flue dust from solids that form into a matte and a slag thereon, wherein the improvement comprises increasing the ratio of the partial pressure of sulphur to the partial pressure of oxygen in the gases from a lower value of said ratio in an upper portion of said shaft to a higher value of said ratio in a lower portion of said shaft before conducting the gases into said settler part thereby reducing, in the lower part of the reaction shaft, trivalent iron and nickel oxides produced by oxidation, in order to prevent oxidation of the matte in the settler part and to prevent the incorporation of nickel oxide into the slag phase.

2. The method of claim 1, wherein the reduction of the reaction gases is carried out to such an extent that the oxidic compounds, including non-iron metal com-

TABLE 10.—HEAT BALANCE FOR PROCESS VIII

| | Example VIII: Oxydation-reduction, rich matte | | | | | |
|---|---|---|---|---|---|---|
| | Reaction shaft | | | Furnace part | | |
| Example balance component | Temperature, °C. | Amount of material, kg.-Nm.³ | Amount of heat, Mcal./t. | Temperature, °C. | Amount of material, kg.-Nm.³ | Amount of heat, Mcal./t. |
| In: | | | | | | |
| Concentrate | 25 | 1,000.0 | 978.8 | | | |
| Cu-Ni-residue | 25 | 60.0 | 15.4 | | | |
| Sand | 25 | 195.0 | −2.1 | | | |
| Shaft product | | | | 1,452/1,600 | | 395.6 |
| Gas phase | | | | | 1,433.5 | 981.8 |
| Oil | | | | | 40.5 | 392.9 |
| Light petrol | 25 | 29.9 | 319.6 | | | |
| Air | 450 | 1,433.1 | 195.7 | 25 | 589.2 | |
| Oxygen | 25 | 17.3 | | | | |
| In total | | | 1,507.4 | | | 1,750.3 |
| Out: | | | | | | |
| Shaft product | 1,452/1,600 | 1,112.0 | 395.6 | | | |
| Matte | | | | 1,250 | 113.0 | 134.9 |
| Slag | | | | 1,350 | 898.0 | 349.9 |
| Flying dust | | | | 1,360 | 75.0 | 25.4 |
| Gas phase | 1,452/1,600 | 1,433.5 | 961.8 | 1,360 | 2,024.0 | 1,080.6 |
| Losses of heat | | | 156.0 | | | 156.0 |
| Out total | | | 1,513.4 | | | 1,746.8 |
| Difference | | | −6.0 | | | 3.5 |

What is claimed Is;

1. An improved method of flash smelting sulphide ores in a furnace having a vertical reaction shaft and a settler part extending below the reaction shaft, in which a fine-grained concentrate is suspended into a heated downward flow of an oxygen containing gas in the reaction shaft to oxidize non-oxidic metal compounds in the pounds in the slag are reduced into their respective metals.

3. The method of claim 1, wherein the reduction of the reaction gases is carried out to such an extent that the oxidic compounds, including non-iron metal compounds in the slag are sulphidized into their respective metal sulphides.

4. The method of claim 1, characterized in that the reduction of the reaction gases is carried out to such an extent that the iron oxide contained in the slag is prevented from oxidizing into magnetite, that the created $Fe_3O_4$ is reduced, and that the iron remains approximately bivalent.

5. The method of claim 1, characterized in that the reaction gases are reduced to such an extent that an essential part of the sulphur content of the gases is recovered as elemental sulphur.

6. The method of claim 1, characterized in that the reduction of the gases is regulated so that the exhaust gases have the desired $SO_2$ content.

* * * * *